Dec. 24, 1968 G. A. VALENTINE 3,417,947

CATAPULT ROCKET REPOSITIONING DEVICE

Filed Feb. 15, 1966 7 Sheets-Sheet 1

INVENTOR
GORDON A. VALENTINE

BY Strauch, Nolan, Neale, Nies & Bronaugh
ATTORNEYS

Dec. 24, 1968 G. A. VALENTINE 3,417,947

CATAPULT ROCKET REPOSITIONING DEVICE

Filed Feb. 15, 1966 7 Sheets-Sheet 2

INVENTOR
GORDON A. VALENTINE

BY Strauch, Nolan, Neale, Nies & Bronaugh
ATTORNEYS

CATAPULT ROCKET REPOSITIONING DEVICE

Filed Feb. 15, 1966 7 Sheets-Sheet 3

INVENTOR

GORDON A. VALENTINE

BY

Strauch, Nolan, Neale, Nies & Bronaugh
ATTORNEYS

Dec. 24, 1968 G. A. VALENTINE 3,417,947

CATAPULT ROCKET REPOSITIONING DEVICE

Filed Feb. 15, 1966 7 Sheets-Sheet 4

INVENTOR

GORDON A. VALENTINE

Strauch, Nolan, Neale, Nies & Bronaugh

ATTORNEYS

Dec. 24, 1968 G. A. VALENTINE 3,417,947

CATAPULT ROCKET REPOSITIONING DEVICE

Filed Feb. 15, 1966 7 Sheets-Sheet 5

INVENTOR

GORDON A. VALENTINE

BY

Strauch, Nolan, Neale, Nies & Bronaugh
ATTORNEYS

Dec. 24, 1968 G. A. VALENTINE 3,417,947

CATAPULT ROCKET REPOSITIONING DEVICE

Filed Feb. 15, 1966 7 Sheets-Sheet 6

INVENTOR

GORDON A. VALENTINE

BY

Strauch, Nolan, Neale, Nies & Bronaugh

ATTORNEYS

CATAPULT ROCKET REPOSITIONING DEVICE

Filed Feb. 15, 1966 7 Sheets-Sheet 7

INVENTOR
GORDON A. VALENTINE
BY
Strauch, Nolan, Neale, Nies & Bronaugh
ATTORNEYS United States Patent Office 3,417,947
Patented Dec. 24, 1968

3,417,947
CATAPULT ROCKET REPOSITIONING DEVICE

Gordon A. Valentine, Denver, Colo., assignor to Stanley Aviation Corporation, Denver, Colo., a corporation of New York Filed Feb. 15, 1966, Ser. No. 527,412
22 Claims. (Cl. 244—122)

ABSTRACT OF THE DISCLOSURE

A catapult rocket repositioning device having an inertia wheel for sensing the pitch attitude of a seat structure during its ejected flight from a parent vehicle. The rocket thrust vector is corrected by operation of the inertia wheel to minimize pitch perturbations of the seat structure during rocket ignition.

This invention relates to apparatus for recovering loads from air or space vehicles and is especially applicable to aerial recovery systems of the type wherein an ejection seat, an esctpe capsule, or other form of load is first separated from the vehicle by rocket power and then recovered by parachute. In particular, this invention is concerned with a rocket-powered ejection seat structure having a novel rocket repositioning device for automatically moving the rocket thrust vector relative to the center of gravity of the mass being ejected so as to overcome the effects of an initial misalignment.

Stability of an ejection seat structure during its rocket-powered flight from the parent vehicle is essential for a number of reasons. First, large excursions in pitch or roll reduce the effective vertical component of rocket impulse with a resulting reduction in tail clearance and trajectory height. The latter is especially critical under adverse ejection conditions such as low level combined with high bank angles and large sink rates. Second, the aerodynamic pitching moment of a typical unstabilized seat will rotate the seat toward an angle of attack producing maximum drag. Third, the pitching rates developed by a seat with a misaligned ejection catapult rocket at zero ejection velocity might be on the order of 800 degrees per second. This high rotational rate makes subsequent wrap-up of drogue and recovery parachute lines a distinct possibility. Finally, random attitude excursions at high ejection speeds make it difficult to restrain the man's legs and arms against the oscillating drag and inertia loads. Also, severe seat oscillations pose the problem of head injury by contact with the headrest.

It has been observed that seat rotation (pitch, yaw, and roll) occurs as a result of disturbing turning moments which arise when the resultant of external forces acting on the ejection seat or escape capsule does not pass through the instantaneous center of gravity of the ejected mass. One of the most predominant turning moments occurs when the line of thrust of the rocket does not pass through the instantaneous center of gravity of the mass being ejected.

The magnitude and direction of the rotational impulse produced by the eccentricity of the rocket thrust line relative to the instantaneous center of gravity of the mass being ejected is dependent upon several factors, of which the most important are:

(a) Excursions of the center of gravity after separation from the nominal rocket thrust line. These excursions include (1) initial, pre-ejection, '1G," eccentrically resulting from variations in the man's weight and center of gravity and variations in seat equipment weight (e.g., heavy and light survival kits); (2) dynamic eccentricity changes caused by the "jelly-like" behavior of the human body and by the initial slack and elasticity of the cushions and restraint harness which permit the man's center of gravity to move appreciably as a function of applied acceleration during ejection; and (3) variations in the center of gravity owing to changes in the configuration of the seat during ejection as caused, for example, by deployment of drogue parachute systems or stabilizing aerodynamic surfaces tnd burning of the rocket propellant.

(b) Excursions of the effective rocket thrust vector from the "nominal thrust line" due to structural deformation, manufacturing tolerances, and rocket nozzle erosion.

(c) Variations in rocket impulse.

(d) Damping moment owing to Coriolis acceleration acting on the rocket propellant mass flow.

From the foregoing, it is apparent that, for practical purposes, the instantaneous center of gravity of the mass being ejected cannot be predetermined precisely owing to the random variations that are involved. Accordingly, a rocket which is fixed relative to the ejection seat, is likely to have a thrust vector which will be eccentric relative to the instantaneous center of gravity of the mass being ejected to cause the seat to pitch even though the position of the rocket is manually adjusted to some selectively fixed position prior to use.

The present invention therefore contemplates and has as its major object the provision of a novel rocket repositioning device for stabilizing a seat structure such as an ejection seat or escape capsule by controlling the position of the rocket catapult thrust vector during ejected flight of the seat or the capsule. The term "seat structure" as employed in the specification and claims herein is intended to designate all forms of seat constructions including the standard type of ejection seat as illustrated in the drawings and escape capsules that separate in any fashion from the parent vehicle.

A more specific object of this invention is to provide a novel apparatus which is responsive to a change in attitude of a seat structure during ejection to adjust the rocket thrust vector to a position relative to the center of gravity of the mass being ejected such that the effects of an initial eccentricity are minimized.

Another object of this invention is to provide a novel unidirectional rocket repositioning device for stabilizing a seat structure during its ejected flight.

A further object of this invention is to provide a novel rocket repositioning device which controls the chamber pressure in the seat ejection rocket to achieve a correction of the rocket position for minimizing the pitch perturbations on the seat structure during the rocket powered portion of its ejected flight.

Still another object of this invention is to provide a novel automatic rocket repositioning device which is simple in construction, inexpensive to manufacture, and capable of adaptation to existing rocket catapults with minimal modification to the existing rockets.

Further objects of this invention will appear as the description proceeds in connection with the appended claims and the annexed drawings wherein:

Figure 1:
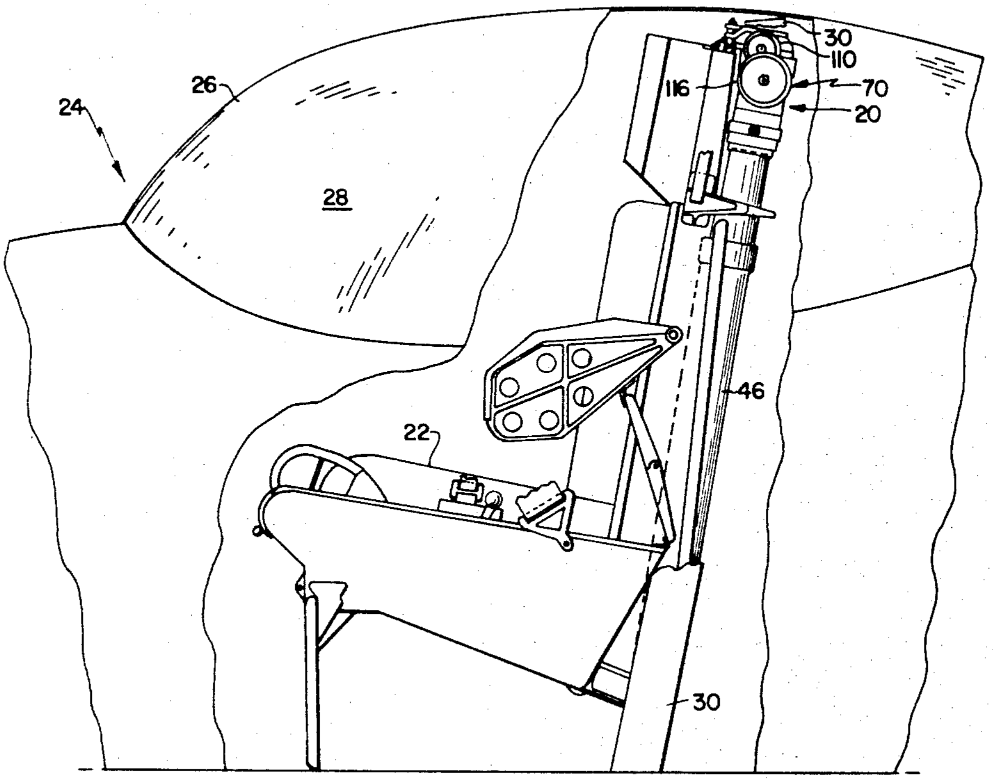
FIGURE 1 is a fragmentary side elevation of an aircraft having a rocket powered ejection seat and the rocket repositioning device of this invention.
Figures 2, 5, 6:
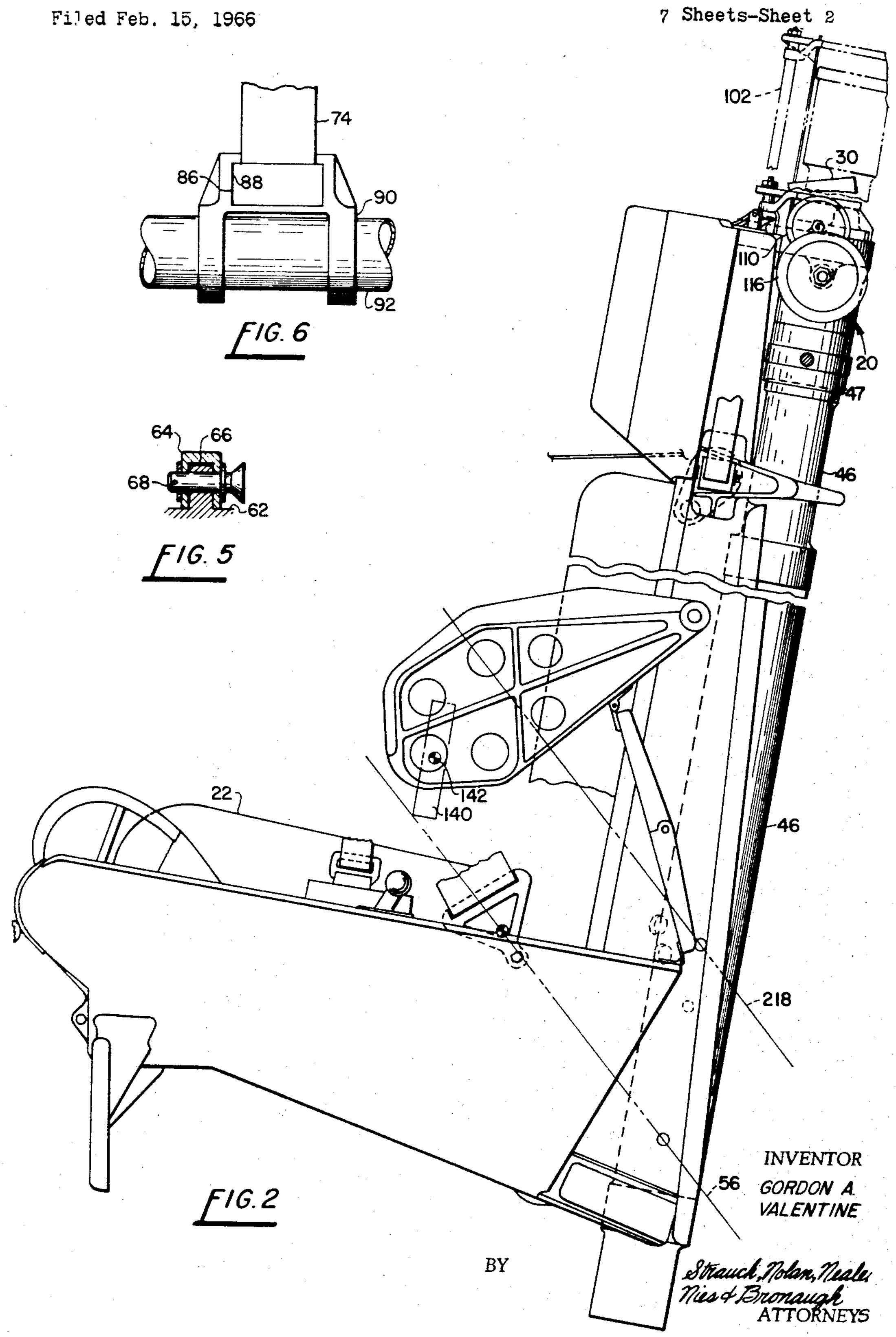
FIGURE 2 is an enlarged side elevation of the ejection seat and rocket repositioning device illustrated in FIGURE 1.
FIGURE 5 is a section taken substantially along lines 5—5 of FIGURE 4.
FIGURE 6 is a fragmentary section taken substantially along lines 6—6 of FIGURE 4.
Figure 3:
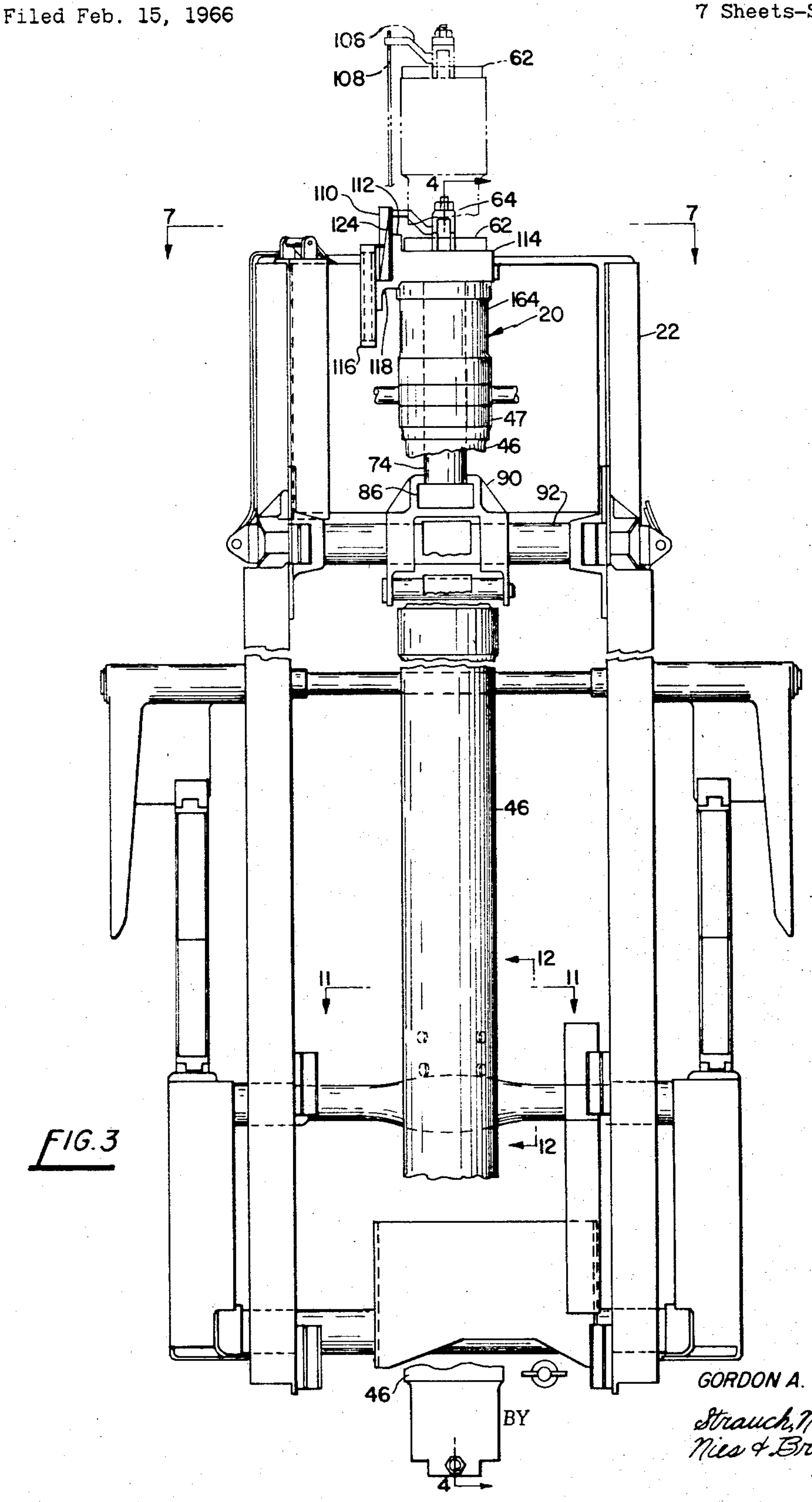
FIGURE 3 is a rear elevation of the structure shown in FIGURE 2.

Referring now to the drawings and more particularly to FIGURES 1–3, the reference numeral 20 generally designates a rocket motor catapult assembly as applied to an ejection seat 22 in an aircraft 24. Seat 22 may be of any suitable, conventional form such as, for example, a USAF F–106 seat structure. It will be appreciated, however, that the rocket catapult apparatus incorporating this invention may also be applied to various other seat structures such as a B–58 escape capsule.

In this embodiment, the aircraft is shown to have a jettisonable canopy 26 for enclosing a cockpit 28. Seat 22 is mounted in cockpit 28 between a pair of upstanding parallel guide rails 30 (one shown in FIGURE 1) in the usual manner. To effect an escape, canopy 26 is first jettisoned and seat 22 is then ejected upwardly by rocket assembly 20.

Figure 4:
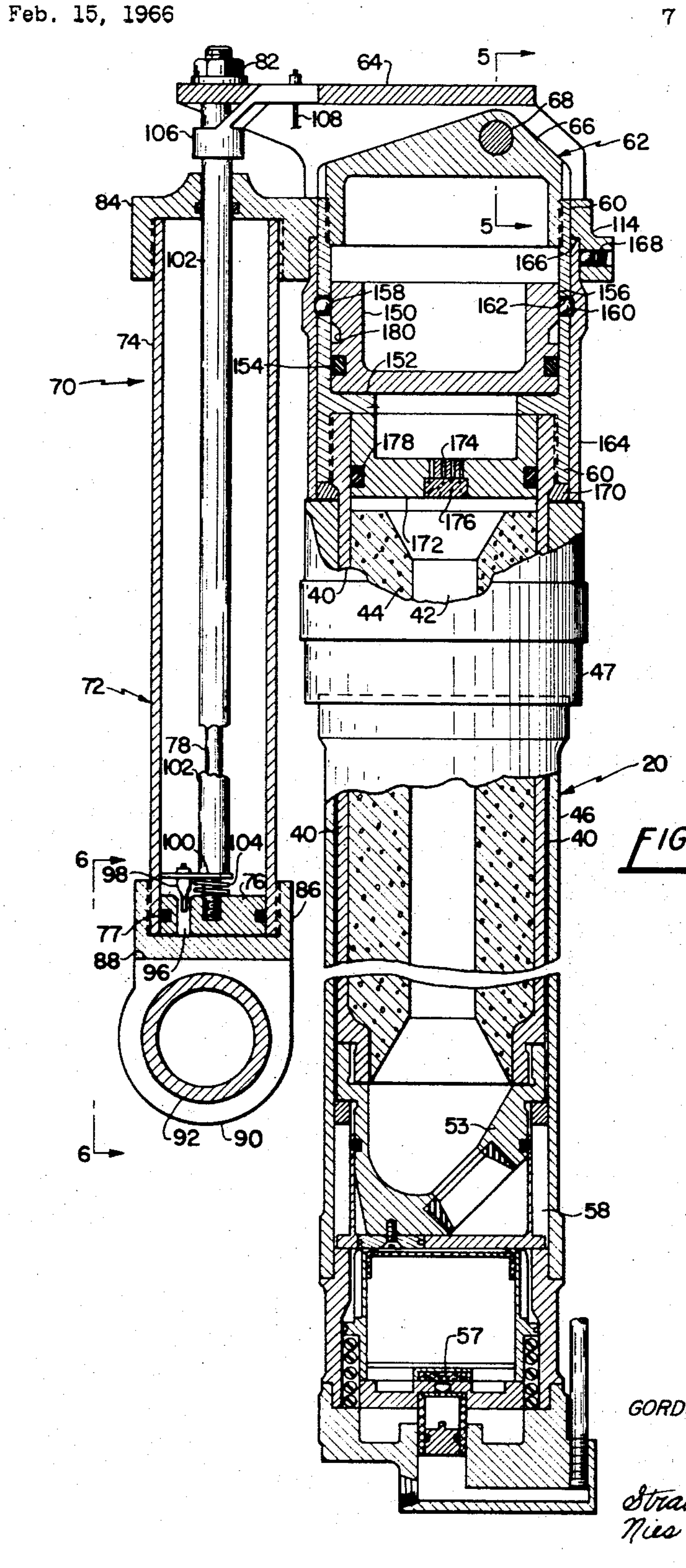
FIGURE 4 is an enlarged section taken substantially along lines 4—4 of FIGURE 3.

As shown in FIGURES 2–4, assembly 20 is mounted on the back of seat 22 and comprises a rocket motor tube 40 which defines a combustion chamber 42 for receiving a suitable, gas-generating propellant indicated at 44. Motor tube 40 is slidably received in a catapult tube 46 which is securely mounted medially between opposite sides of the seat back. The upper end of catapult tube 46 is secured to a trunnion 47 which slidably receives the upper end of motor tube 40 and which is rigidly fixed to guide rails 30.

A rocket nozzle 53 threadedly secured to the lower end of motor tube 40 is directed downwardly and rearwardly such that in the position of assembly 20 shown in FIGURES 1–4, a thrust is produced which acts along a line 56 (see FIGURE 2). Line 56 transversely intersects the longitudinal axis of tube 40 and extends at an acute angle with the horizontal.

The lower end of catapult tube 46 contains the usual firing mechanism and catapult cartridge assembly as indicated at 57. Prior to firing, the rocket motor is releasably locked to catapult tube 46 by a suitable device such as a double tang lock 58.

The rocket catapult structure thus far described is conventional and is generally common to most rocket catapults such as, for example, the Model 1057–2 manufactured by Rocket Power, Inc. When the catapult cartridge of assembly 57 is fired, lock 58 is first released from catapult tube 46 and then after having moved to near the upper end of tube 46 is released from nozzle 53. At this time, a light screw joining lock 58 to nozzle 53 is pulled loose, permitting hot gas generated by the ignition of the catapult cartridge to enter the rocket motor and to ignite propellant 44. Ignition of propellant 44 thrusts seat 22 upwardly to separate from the aircraft. Since this catapult operation is standard and well known, further description is not deemed necessary for an understanding of this invention.

As best shown in FIGURE 4, motor tube 40 is coaxially threaded into an open ended motor tube extension 60. A rocket end fitting 62 is securely threaded into the upper end of extension 60. A rocket support arm 64 extends over fitting 62 and is formed with a downwardly opening channel which interfittingly receives an upstanding ear 66. Ear 66 is integral with fitting 62 and is apertured to receive a ball lock pin 68. Pin 68, as best shown in FIGURE 5, extends through aligned apertures in opposed side wall portions of support arm 64 to secure the sub-assembly of fitting 62, extension 60, and tube 40 to arm 64.

Support arm 64 and extension 60 form a part of the novel rocket repositioning device of this invention. This device is generally indicated at 70 in the drawings and, as will be described in detail later on, responds to a change in seat pitch attitude during ejection to axially shift rocket motor assembly 20 to a position in which the rocket thrust line acts eccentrically to the instantaneous center of gravity of the mass being ejected so as to overcome the effects of an initial eccentricity of the opposite sign.

As best shown in FIGURE 4, a control cylinder assembly 72 forming a part of device 70 comprises a rigid piston cylinder 74 which slidably receives a piston 76. A resilient, groove seated O-ring 77 carried by piston 76 is compressed against the internal cylinder wall surface to provide a fluid tight seal between cylinder 74 and piston 76.

Piston 76 is threaded onto the lower end of a piston rod 78 which extends coaxially through the upper end of cylinder 74. The upper end of rod 78 is securely fixed to support arm 64 by a nut 82. With this construction, therefore, motor tube 40, extension 60, support arm 64, piston rod 78, and piston 76 are secured together for limited, unitary axial movement relative to cylinder 74 and seat 22. The cylinder space above piston 76 is filled with hydraulic fluid.

The upper and lower ends of cylinder 74 are respectively closed by fittings 84 and 86. Fitting 84 is threaded onto cylinder 74 and is formed with a central opening through which piston rod 78 coaxially extends. Fitting 86 also is threaded onto cylinder 74 and is slidably received in a T-shaped slot 88 (see FIGURE 6) which is formed in a support fitting 90. An unshown, removable pin secures fitting 86 in place within slot 88.

Fitting 90 is rigidly mounted on a horizontal cross tube 92 which forms a part of the frame for seat 22. Tube 92 extends between the back of seat 22 and rocket motor assembly 20. During ejection, seat 22 is supported from the upper end of extension 60 by support arm 64, rod 78, piston 76 and hydraulic fluid pressure in the cylinder space above piston 76.

Cylinder 74 extends between the back of seat 22 and the sub-assembly of motor tube 40 and extension 60 adjacent to the upper end thereof. The axis of cylinder 74 is parallel to the aligned axes of extension 60 and tube 40.

As shown in FIGURE 4, piston 76 is formed with an orifice 96 which provides for fluid communication between the cylinder spaces on opposite sides of the piston. A needle valve 98, which is fixed by an arm 100 to a tube 102, controls flow of hydraulic fluid through orifice 96. Tube 102 slidably and coaxially receives piston rod 78 and slidably extends through fitting 84. A spring 104 peripherally surrounding the lower end of piston rod 76 reacts against piston 76 to bias tube 102 upwardly. Valve 98 is normally held out of orifice 96 by spring 104, and, except for this spring load, tube 102 is free to slide axially down piston rod 78 to seat valve 98 in its closed position in orifice 96. When valve 98 is closed, upward displacement of piston 76 is arrested by the pressure of fluid in cylinder 74.

As shown in FIGURES 3, 4, 7 and 8, a rigid arm 106 is fixed to the upper end of tube 102 protruding beyond cylinder 74 and is secured by a flexible chain or cable 108 to a piston stroke control pulley 110. Pulley 110 is rotatably mounted on a laterally extending trunnion section 112 which is formed integral with a main support collar 114 for rocket assembly 20. Collar 114 is formed integral with fitting 84 and thus is rigidly fixed to seat 22.

Figures 8, 12, 14:
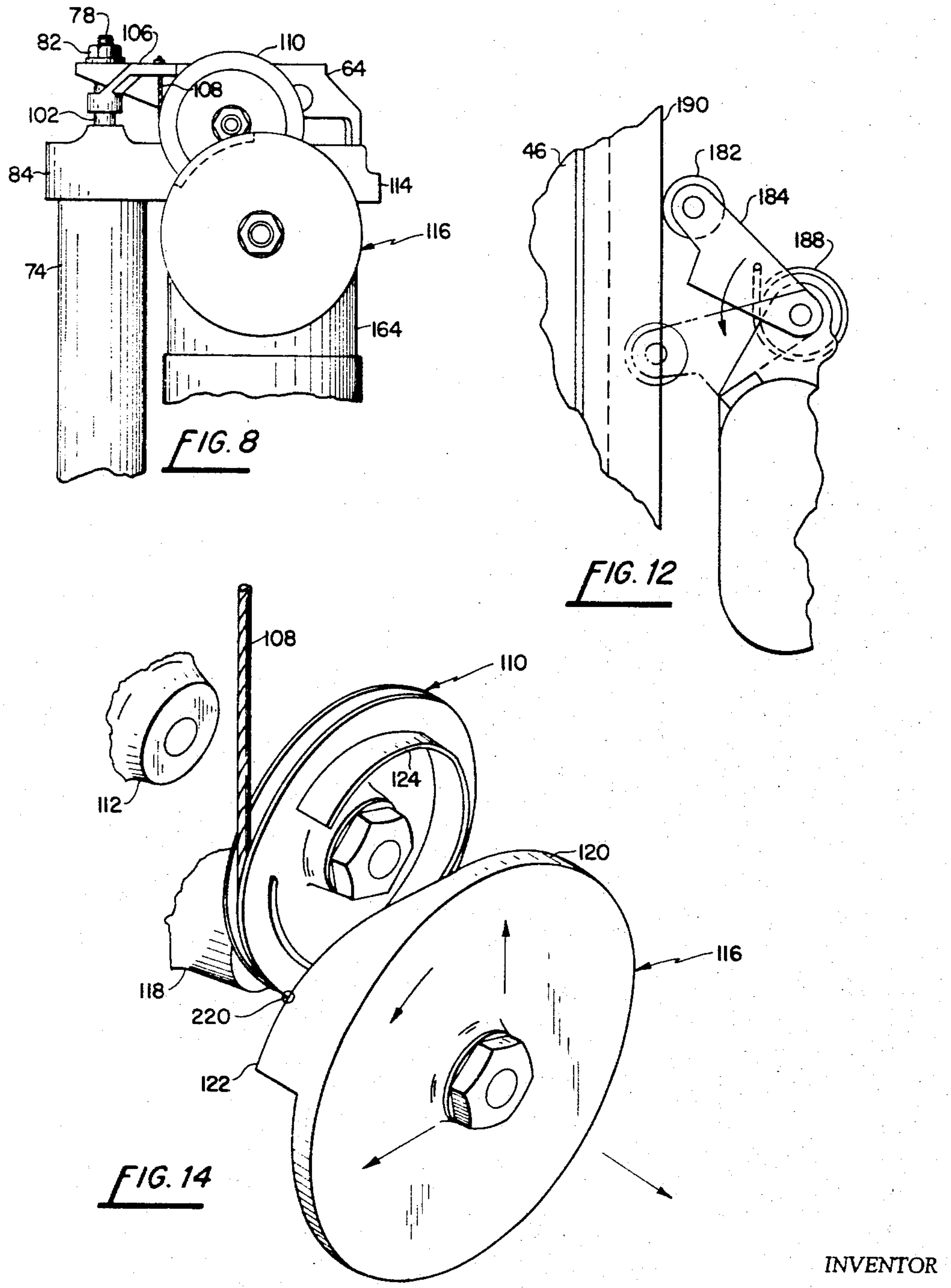
FIGURE 8 is an enlarged side elevation of the rocket repositioning device as shown in FIGURE 2.
FIGURE 12 is a fragmentary section taken substantially along lines 12—12 of FIGURE 3.
FIGURE 14 is a fragmentary, partially exploded, perspective view of the rocket repositioning device shown in the previous figures.

Controlling rotation of pulley 110 is an attitude sensing device comprising an inertia wheel 116 which is rotatably mounted by unshown low friction bearings on a trunnion section 118. Section 118 is integral with and extends laterally from support collar 114 in parallel with trunnion section 112. The rotational axes of pulley 110 and inertia wheel 116 are parallel and extend laterally of seat 22. The axis of wheel 116 normally intersects the longitudinal axis of motor tube 40, and the axis of pulley 110 is disposed above and slightly forwardly of the inertia wheel rotational axis as best shown in FIGURE 8. Inertia wheel 116, pulley 110, tube 102, and valve 98 all form a part of the rocket repositioning device 70.

Inertia wheel 116 is constructed to provide a maximum polar moment of inertia for minimum weight. Consequently, wheel 116 is preferably provided with a rim 120 which may be of suitable material such as, for example, lead or tungsten alloy. Wheel 116 is carefully balanced to insure that ejection accelerations impose negligible torque on the wheel. In place of wheel 116, it will be appreciated, especially from the following description, that a carefully balanced mass of any other shape may be used.

Figure 7:
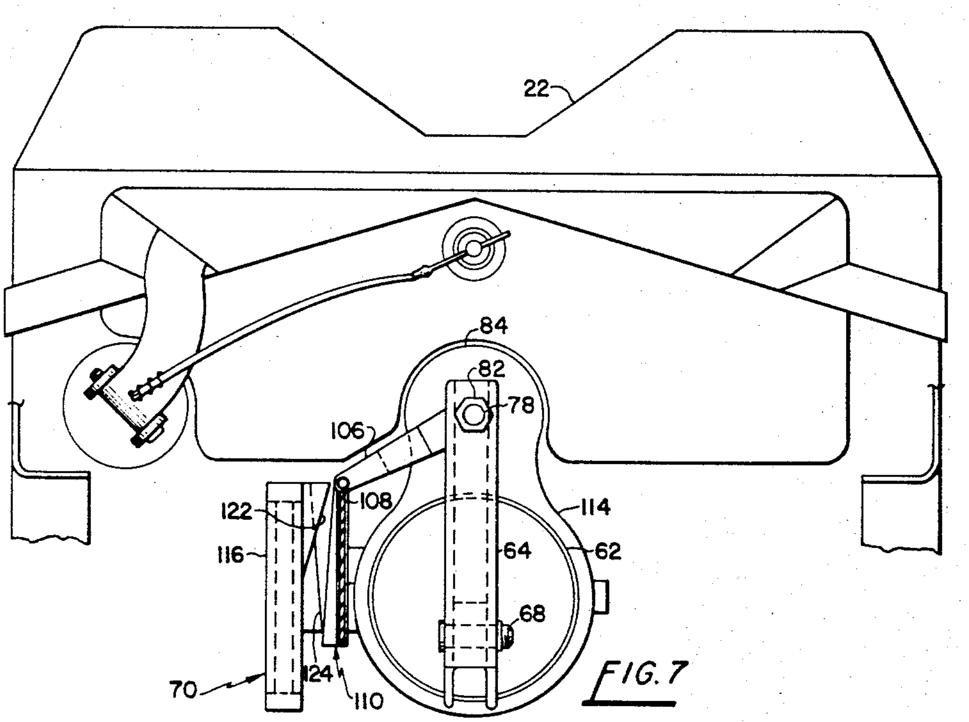
FIGURE 7 is a top plan view of the structure shown in FIGURES 2 and 3.
Figure 9:
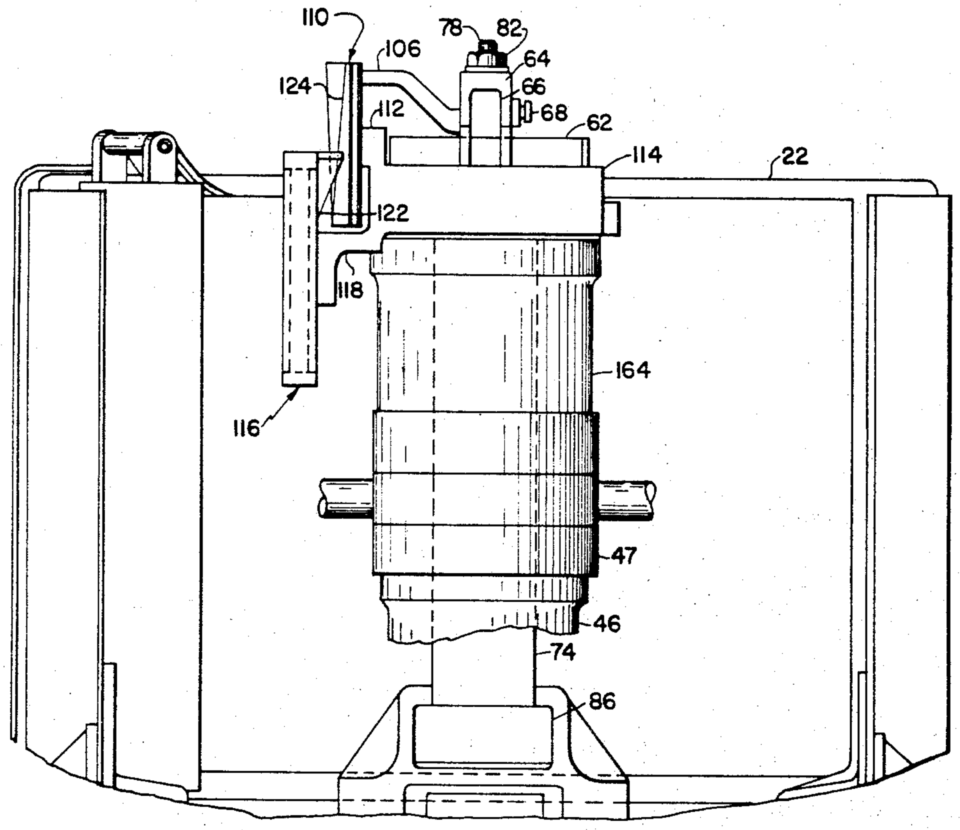
FIGURE 9 is an enlarged, fragmentary end elevation of the rocket repositioning device as shown in FIGURE 3.

Referring to FIGURES 7, 9 and 12, inertia wheel 116 is supported on collar 114 forwardly of pulley 110. A tapered or inclined flange 122 preferably formed integral with rim 120 projects axially toward pulley 110 for engagement with a tapered flange 124. Flange 124 advantageously is formed integral with the rim of pulley 110. Flange 122 is so inclined relative to flange 124 that it provides a stop abutment surface for limiting relative rotation of pulley 110. Pulley 110 may be biased in a direction to keep cable 108 taut.

Figure 10:
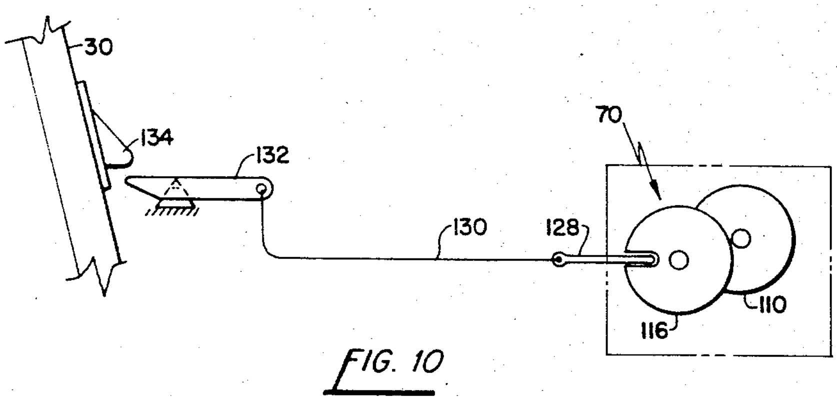
FIGURE 10 is a schematic view illustrating the system for placing the rocket repositioning device of this invention in operation upon ejection of the seat structure.

As best shown in FIGURE 10, a pin 128 is received in a hole in inertia wheel 116 to releasably back wheel 116 against rotation. Pin 128 is connected by a suitable mechanical motion transmitting linkage 130 to a lever 132. Lever 132 is pivotally mounted on seat 22 adjacent to one of the seat rails 30 and engages a rail trip when seat 22 is ejected upwardly through a predetermined distance to pull pin 128 out of inertia wheel 116.

Once pin 128 is removed, the only torque input to inertia wheel 116 is the torque applied by the unshown bearings which rotatably support wheel 116 on trunnion section 118. Since this torque is extremely small, inertia wheel 116 tends to remain substantially fixed against rotation in its initial pitch orientation. This initial pitch orientation is not affected by linear accelerations or rotation about the yaw or roll axis owing to the orientation of the rotational axis of the wheel and to the precise balance of the wheel.

Tendency of inertia wheel 116 to remain fixed in its initial pitch orientation after pin 128 is removed results in an apparent (from the seat) forward rotation of the top of wheel 116 (i.e. in a counterclockwise direction as viewed from FIGURE 8) when seat 22 pitches aft. This rotation of wheel 116 advances flange 122 relative to flange 124.

Before and during corrective displacement of rocket assembly 20, valve 98 is biased to its opened position by spring 104. Rocket assembly 20 is initially locked to seat 22 by means to be described in detail later on. When rocket assembly 20 is released for corrective action, it moves axially upwardly under its own power. Piston 76 is stroked upwardly unitarily with rocket assembly 20 with the result that fluid will flow through orifice 96 and into the cylinder space below piston 76. Upward displacement of piston 76 raises tube 102 to unwrap cable 108 and thereby rotate pulley 110 to a position where flange 124 engages flange 122. When this occurs, upward displacement tube 102 is arrested to compress spring 104 and thereby close valve 98. When valve 98 closes, the fluid in the cylinder spaces on opposite sides of piston 76 hydraulically lock piston 76 and, consequently, rocket assembly 20 in their upwardly displaced positions. This corrective operation will be explained in greater detail shortly.

To determine the initial position of rocket assembly 20, the expected excursions or changes in position of the center of gravity for the man-seat mass are established by taking into account all of the previously listed, essential factors which contribute to a shift in the center of gravity. By locating these expected excursions of the center of gravity, an envelope containing the excursions may be obtained. This center of gravity envelope is indicated at 140 in FIGURE 2 and is shown to be of essentially rectangular configuration. The mean center of gravity for the envelope is indicated at 142. When rocket assembly 20 and the rocket repositioning device 70 are installed in the aircraft, the rocket thrust line 56, according to this invention is aimed to pass through the lower, forward corner of envelope 140 as shown in FIGURE 2.

By initially aiming the rocket thrust vector at one end of envelope 140, corrective repositioning of the catapult rocket need be made in only one direction. Unidirectional correction, it will be appreciated, greatly simplifies the construction of the rocket repositioning device.

By choosing the lower, forward corner of envelope 140 as the initial aiming point, it is also evident that only upward correction is needed. As a result, the upward axial thrust of rocket assembly 20 is adequate to realign the rocket thrust vector to a new higher position. Consequently, no external power sources are needed, and device 70, being only required to control the power inherent in the catapult rocket, is thus further simplified.

To releasably lock rocket assembly 20 in its initial aiming position, a locking piston 150, as shown FIGURE 4, is coaxially and slidably received in extension 60 and is seated on an annular, radially inwardly extending ledge 152 formed integral with extension 60. A resilient, groove-seated O-ring 154 carried by locking piston 150 is compressed against the internal periphery of extension 60 to prevent combustion gases generated in chamber 42 from escaping into the upper end of extension 60 above piston 150.

At its upper end, piston 150 is formed with a cylindrically smooth skirt portion 156 which radially aligns with a series of radial bores 158 formed through the wall of extension 60. A corresponding number of locking balls 160 displaceably received in bores 158 are each formed with uniform diameters that are greater than the wall thickness of extension 60. By interfittingly receiving skirt portion 156 in extension 60, therefore, locking balls 160 are displaced to positions where they partially protrude beyond the external periphery of extension 60 and into a radially aligning recess 162 formed in a locking collar 164. In the position of parts shown in FIGURE 4, piston 150 prevents inward displacement of locking balls 160 to thus lock the sub-assembly of extension 60, motor tube 40, and fitting 62 to collar 164.

Locking collar 164 slidably receives extension 60 and coaxially extends into a counterbored recess 166 formed in support collar 114. Support collar 114 is seated on the upper end of locking collar 164 and slidably receives the upper end of extension 60. The lower end of locking collar 164 is seated on the upper end of trunnion 47. Locking collar 164 acts as a spacer between rocket assembly 20 and support collar 114 prior to rocket release. Upward loads from extension 60 are transferred through locking balls 160 and locking collar 164 to support collar 114. A spring-loaded ball and detent assembly 168 releasably holds locking collar 164 up in support collar 114 after rocket release. Assembly 168 allows support collar 114, seat 22 and the components mounted on collar 114 to be slid up and off locking collar 164 to facilitate removal of the seat structure after ball lock pin 68, which secures support arm 64 to end fitting 62, has been removed. With this construction, locking collar 164 along with the rocket catapult may be left in the aircraft when seat 22 is removed for maintenance or replacement.

Three curved spacer blocks 170 (two shown in FIGURE 4) are secured by unshown set screws to locking collar 164 to guide rocket assembly 20 after the lower end of tube extension 60 has moved above the upper end of the locking collar.

Still referring to FIGURE 4, a cylindrical plug 172 is received in the upper end of tube 40 and is formed with a central through bore 174 which receives an impulse pellet 176. Pellet 176 preferably is composed of the same propellant composition as used in the main rocket propellant. Since it is in the same pressure environment as propellant 44, pellet 176 will have the same burning rate as that of propellant 44. By varying the thickness of pellet 176, therefore, pellet 176 can be made to burn through at any desired percentage of the main rocket propellant irrespective of the initial grain temperature.

Before pellet 176 burns through, plug 172 blocks flow of gases from chamber 42 into the interior of extension 60 below locking piston 150. A resilient groove seated O-ring 178 carried by plug 172 is compressed against the internal periphery of tube 59 to establish a fluid tight seal surrounding plug 172.

When pellet 176 burns through, gases generated by ignition of the main rocket propellant in chamber 42 pass through bore 174 and apply pressure to urge locking piston 150 upwardly to a position where the upper edge of skirt portion 156 butts against the downwardly facing, annular end face of fitting 62 in the upper end of extension 60. In this upwardly displaced position of piston 150, an annular outwardly opening groove 180 formed in the periphery of piston 150 below skirt portion 156 radially aligns with bores 158. Locking balls 160 are urged by the axial rocket thrust vector to seat in groove 180 and thus to release extension 60 from locking collar 164. Rocket motor assembly 20 is now free to move upwardly under the control of rocket repositioning device 70.

Figure 11:
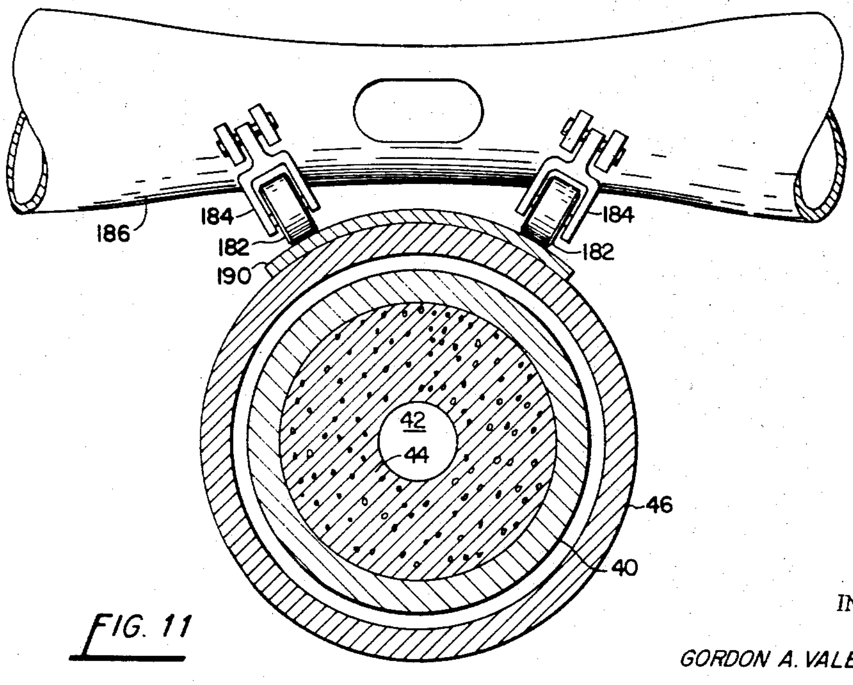
FIGURE 11 is a section taken substantially along lines 11—11 of FIGURE 3.

As best shown in FIGURES 11 and 12, a pair of thrust reaction rollers 182 are rotatably supported on arms 184. Arms 184 are pivotally mounted on a seat back cross tube 186 and are biased downwardly by torsion springs 188. Rollers 182 are swingable in planes which normally intersect the longitudinal axis of motor tube 40 and which are at equal acute angles with the rocket thrust line as viewed from FIGURE 11. Each roller 182 is rotatable about an axis which is parallel to the pivot axis of its arm 184. Cross tube 186 is suitably fixed to the frame of seat 22.

When seat 22 is mounted in the aircraft, rollers 182 engage a filler strip 190 fixed on the outer periphery of catapult tube 46 and facing the back of seat 22. The thickness of filler strip 190 is equal to the thickness of the flange on the upper end of catapult tube 46. Filler strip 190 thus provides a smooth surface along which rollers 182 ride. Arms 184 are swung upwardly against the bias of springs 188 in the installed position of parts shown in FIGURES 1–3.

When seat 22 is ejected upwardly along guide rails 30, the upwardly swung rollers 182 ride up along filler strip 190 and swing down under the bias exerted by springs 188 after they clear the top of catapult tube 46. In this way, the final clearance between motor tube 40 and rollers 182 is reduced to about ⅛ of an inch as shown in the downwardly swung phantom line positions of the rollers in FIGURE 12. This greatly reduces the impact load when rocket assembly 20 is pushed against rollers 182 after the rollers clear the top of catapult tube 46. Rollers 182 minimize friction at the region where most of the rocket thrust will be reacted. In addition, rollers 182 minimize the angular change of motor tube 40 which might cause binding in locking collar 164 during repositioning movement of rocket assembly 20.

Figure 13:
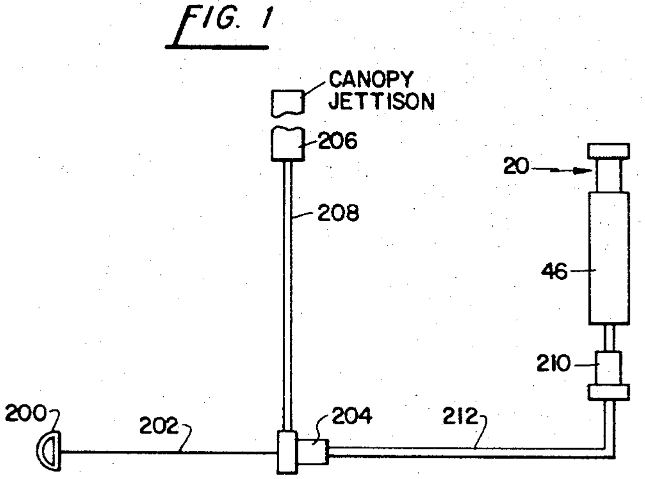
FIGURE 13 is a diagrammatic view of the control system for initiating ejection of the seat structure shown in the previous figures.

Any suitable, conventional ejection control system may be employed to jettison canopy 26 and to activate the cartridge and firing mechanism assembly 57 for effecting a rocket-powered escape with the apparatus of this invention. In FIGURE 13, for example, an ejection control handle 200 is shown to be operatively connected by a mechanical linkage 202 to an initiator 204 of suitable form. Initiator 204 is connected to a canopy jettisoning mechanism 206 by a ballistic line 208 and also to a time delay rocket catapult initiator 210 by a ballistic line 212. Initiator 210 actuates the firing mechanism of assembly 57.

When control handle 200 is pulled by the occupant of seat 22, initiator 204 is activated to almost instantaneously jettison canopy 26. After a delay of about 0.5 second, which permits canopy 26 to be jettisoned clear of the seat ejection path, initiator 204 operates to actuate the catapult cartridge firing mechanism thereby firing the cartridge of assembly 57. When nozzle 53 nears the upper end of catapult tube 46, lock 58 releases to allow ignition of propellant 44 as previously explained. The thrust exerted by burning propellant 44 pushes seat 22 upwardly.

Pellet 176 is ignited almost simultaneously with the ignition of propellant 44 and begins to burn through. Until pellet 176 burns through, however, the gases generated by burning propellant 44 are contained in chamber 42 by plug 172 and the unburned portion of pellet 176. As a result, locking piston 150 remains seated on ledge 152 to hold locking balls 160 in seating engagement in groove 162 of collar 164. Collar 164, therefore, remains locked to extension 60 by balls 160 until pellet 176 burns through.

Until locking balls 160 are released by upward movement of piston 150, they lock rocket assembly 20 securely to seat 22 and transfer all catapult and initial rocket axial thrust directly from motor tube extension 60 to locking collar 164. Locking collar 164, in turn, transmits the catapult and thrust loads to support collar 114 which is rigidly fixed to seat 22 by the sub-assembly of cylinder 74 and fittings 86 and 90. Thus, for the period preceding burn-through of impulse pellet 176, rocket assembly 20 remains securely locked to seat 22.

By locking rocket assembly 20 against relative axial displacement to seat 22 during the period when impulse pellet 176 is burning through, piston 76 is held in its illustrated seated position on the bottom wall of cylinder 74. Impulse pellet 176 thus provides a sampling period during which a change in the seat attitude does not result in any corrective displacement of rocket assembly 20.

Initial movement of seat 22 upwardly along guide rails 30 displaces lever 132 into engagement with rail trip 134, thereby pulling pin 128 out of inertia wheel 116. Once pin 128 is removed, the orientation of inertia wheel 116 relative to seat 22 is free to change. Any change in seat pitch attitude is now measured against the reference angle provided by inertia wheel 116 which rotates very little, if at all, during the short sampling period because of the negligible torque applied to wheel 116.

Before the main body of rocket propellant burns out, impulse pellet 176 burns through, allowing the pressurized gases in chamber 42 to flow upwardly into the interior of extension 60. As a result, piston 150 is upwardly displaced to release locking balls 160 from engagement with locking collar 164, thereby releasing motor tube extension 60 from collar 164. Axial rocket thrust is now transferred through end fitting 62 and support arm 64 to the assembly of rod 78 and piston 76, tending to lift piston 76 against the pressure of hydraulic fluid in the cylinder space above the piston.

Initially, the narrow end of flange 124 will be nearly in contact with the widest section of flange 122. If nothing occurs to change the relative orientations of pulley 110 and inertia wheel 116, pulley 110, after a very few degrees of rotation, advances its flange 124 in a direction of increasing width until it contacts flange 122. This contact between flanges 122 and 124 prevents further rotation of pulley 110 with the result that upward displacement of rocket motor assembly 20 relative to seat 22 is also prevented.

If, however, the initial relationship between the center of gravity and the ejected mass results in a "nose-up" pitch acceleration of seat 22 during the sampling period, inertia wheel 116 tends to retain its initial orientation in space and pulley 110 rotates aft relative to the inertia wheel. In effect, then, interia wheel 116 rotates counterclockwise relative to pulley 110. This relative counterclockwise rotation of wheel 116 moves a narrower portion of flange 122 to the point where contact with flange 124 will take place when pulley 110 is rotated by the upward displacement of piston 76 and arm 106. Pulley 110 now is permitted to rotate further before it is stopped by contact of flange 124 with flange 122.

Thus, when rocket assembly 20 is released for corrective axial displacement of burn-through of pellet 176, stroke control pulley 110 can be rotated in a clockwise direction (as viewed from FIGURE 4) from its initial position by upward motion of the piston and arm 106 which tensions and unwraps cable 108 from the pulley rim. During the unwrapping of cable 108 and resulting rotation of pulley 110, spring 104 holds needle valve 98 in its opened position to keep orifice 96 open. When rocket assembly 20 is released, its axial thrust component moves it rapidly upwardly, stroking the assembly of piston 76 and rod 78 upwardly along with needle valve 98. This motion may be arrested at any point in the stroke by applying a relatively small load to tube 102 since the force required to stop the upward movement of tube 102 is merely the sum of the pressure load acting on its annular area plus the load applied by spring 104. The total of these loads could be less than 50 pounds.

Thus, when pulley 110 rotates sufficiently far to engage flange 124 with flange 122, it stops to arrest the upward movement of tube 102. By stopping tube 102, valve 98 closes rapidly, reducing flow of hydraulic fluid through orifice 96 to zero and thus stopping upward motion of piston 76 and, consequently, rocket assembly 20. Accordingly, the unique construction of control cylinder assembly 72 allows a relatively small load from inertia wheel 116 and pulley 110 to stop the rapidly moving, upwardly thrusting rocket assembly smoothly and quickly. In this manner, the rocket thrust vector is raised to a position above the instantaneous center of gravity for the seatman mass while the remainder of the main body of rocket propellant is burning.

At the contact point between flanges 122 and 124 as indicated at 220 in FIGURE 14, the tapers of flanges 122 and 124 are such that the engaging flange edges are at right angles to each other. Thus, a tangential force on pulley 110 is applied to wheel 116 as a radial load. This radial load acts through the rotational axis of wheel 116 and thus does not cause wheel 116 to rotate further in either direction. In addition, the friction between the engaging flange surfaces locks inertia wheel 116 against further rotation.

By changing and reversing the sense of the eccentricity between the rocket thrust vector and the center of gravity of the mass being ejected from its initial value, the change in seat pitch attitude is arrested to obtain the desired seat stability at the end of rocket burning. In the first few tenths of a second that the rocket propellant burns, therefore, the apparatus of this invention measures the change in seat pitch attitude and applies a corrective rocket pitching moment to limit the pitch attitude and velocity at rocket burnout to an acceptable level.

Depending upon the magnitude of the change in seat pitch attitude, rocket assembly 20 may be shifted axially upwardly relative to seat 22 to locate the rocket thrust vector as high as line 218 (see FIGURE 2) which is parallel to line 56 and which extends above the upper corners of envelope 140. This assures that the corrected rocket thrust vector passes over the instantaneous center of gravity to correct the initial condition in which it passes below the center of gravity.

From the foregoing description it will be appreciated that orifice 96 and valve 98 also cooperate to dampen the upward velocity of piston 96 and to stop the upward motion of its proper point without excessive impact loads on the rocket or the seat structure. Engagement of the sides of support arm 64 with ear 68 prevents rotation of rocket assembly 20 about its axis as it moves up.

It also will be appreciated that both before and after rocket release, cylinder 74 transfers loads from support collar 114 down to seat 22. Accordingly, seat 22 hangs or is suspended from the lower end of control cylinder assembly 72 which, as previously described, is secured at its upper end to collar 114.

The rocket repositioning device of this invention is so constructed that in applying it to an existing rocket catapult only minor modifications to the rocket catapault are required. For example, no modifications to the previously mentioned Model 1057–2 are required except for the replacement of an upper lug end fitting and its retaining ring by the previously described rocket release and guide assembly which essentially consists of end plug 172, impulse pellet 176, motor tube extension 60, locking piston 150, end fitting 62, support arm 64, locking collar 164, locking balls 160, and spacer blocks 170. Furthermore, the entire rocket repositioning device of this invention is so constructed and arranged that it is removable from seat 22 simply by removing the unshown pin which secures fitting 86 in slot 88. Maintenance and replacement is thus easily and conveniently facilitated.

What is claimed and desired to be secured by Letters Patent is:

1. In combination with an ejection seat structure for an air or space vehicle, a rocket motor secured to said seat structure and being operable upon ignition to eject said seat structure from said vehicle, a catapult tube mounted in said vehicle and receiving said rocket motor, means for catapulting the assembly of said rocket motor and said seat structure from a stationary position in said vehicle to initiate flight of said seat structure away from said vehicle, means for igniting said rocket motor to eject said seat structure from said vehicle and to thereby continue said flight away from said vehicle, and means for stabilizing the attitude of said seat structure in a predetermined direction by controlling the position of the thrust vector of said rocket motor relative to said seat structure during rocket ignition.

2. In combination with an escape system for removing an occupant from an air or space vehicle and having a seat structure in said vehicle and means including a rocket motor secured to said seat structure and being operative to produce a thrust for projecting said seat structure away from said vehicle, the improvement comprising means for sensing a change in the attitude of said seat structure during its flight away from said vehicle, and means responsive to the detection of a change in attitude by said sensing means for adjusting the position of the rocket motor thrust vector in a direction to counteract objectionable pitch perturbations of the mass being ejected.

3. The combination defined in claim 2 wherein said adjusting means is operative to change the position of the rocket thrust vector in a direction to counteract the effects of an initial eccentricity between said rocket thrust vector and the center of gravity of the mass being ejected.

4. The combination defined in claim 3 wherein the position of said rocket motor thrust vector is changed by said adjusting means during ignited rocket flight.

5. The combination defined in claim 4 wherein said adjusting means is operative to provide a controlled displacement of said rocket motor relative to said seat structure in response to detection of a change in attitude by said sensing means.

6. The combination defined in claim 5 wherein said rocket motor is displaced along its longitudinal axis under the control of said adjusting means.

7. The combination defined in claim 5 wherein said rocket motor is so positioned prior to displacement by said adjusting means that correction of the position of said rocket motor relative to the center of gravity of the mass being ejected is required in only one direction.

8. The combination defined in claim 5 wherein a part of said adjusting means provides for the support of said seat structure from said rocket motor during ejection.

9. The combination defined in claim 6 wherein said rocket is mounted prior to ejection in said vehicle and is aimed so that its rocket motor thrust vector aligns substantially with the lowest expected center of gravity of the mass to be ejected.

10. The combination defined in claim 20 comprising means for releasably locking said rocket motor to said seat structure for a predetermined period immediately following ejection of said seat structure, the change in seat structure pitch attitude being measured against the reference angle provided by said inertia element during said period, and means for releasing said rocket motor for controlled axial displacement relative to said seat structure upon the termination of said period.

11. The combination defined in claim 10 wherein said adjusting means further comprises a cylinder fixed to said seat structure and being filled with hydraulic fluid a piston slidable in said cylinder, motion transmitting means rigidly connecting said piston to said rocket motor, the pressure of fluid in said cylinder above said piston being operative to control upward displacement of said piston and said rocket motor relative to said seat structure, fluid flow passage means providing fluid communication between the cylinder spaces on opposite sides of said piston, a valve member for controlling flow of fluid through said passage means, and means operatively associated with said inertia element for controlling the position of said valve member to provide for fluid flow from the cylinder space above said piston to the cylinder space below said piston in proportion to the change in seat structure pitch attitude as measured against the reference angle provided by said inertia element, thereby enabling said piston and said rocket motor to move axially upwardly relative to said seat structure by a predetermined distance under the axial thrust exerted by said rocket motor when said rocket motor is released by said locking means.

12. The combination defined in claim 11 wherein said seat structure is fixedly supported on said cylinder during ejection.

13. The combination defined in claim 12 wherein said locking means comprises a support structure rigidly fixing said cylinder to said rocket motor prior to release.

14. The combination defined in claim 13 wherein said locking means further comprises a locking element actuatable by fluid pressure to effect a release of said rocket motor from said support structure, and means for actuating said locking element by the gases generated by said rocket motor after a predetermined portion of the rocket motor propellant impulse is used.

15. In an occupant escape system having an ejectable seat structure mounted in an air or space vehicle, a rocket motor displaceably mounted on said seat structure for controlling the attitude of the seat structure during its ejected flight from said vehicle, and means responsive to a change in attitude is imparted to said seat structure for adjusting said rocket motor to vary the position of said rocket motor thrust vector relative to the center of gravity of the mass being ejected.

16. The occupant escape system defined in claim 15 wherein said adjusting means is operative to change the position of said rocket thrust vector in a direction to counteract the effects of an initial eccentricity between the center of gravity of the mass being ejected and an ejection thrust acting to eject said seat structure.

17. The occupant escape system defined in claim 16 wherein said adjusting means is operative to provide a controlled displacement of said rocket motor in response to a change in the pitch of said seat structure.

18. In combination with an escape system for removing an occupant from an air or space vehicle and having a seat structure in said vehicle and means including a rocket motor secured to said seat structure and being operative to produce a thrust for projecting said seat structure away from said vehicle, the improvement comprising means for sensing a change in the attitude of said seat structure during its flight, and means responsive to the detection of a change in attitude by said sensing means for adjusting the position of the rocket motor thrust vector relative to the center of gravity of the mass being ejected, said adjusting means being operative during ignited rocket flight to change the position of the rocket motor thrust vector in a direction to overcome the effects of an initial eccentricity between said rocket motor thrust vector and the center of gravity of the mass being ejected, said adjusting means being operative to effect said change in the position of said thrust vector by providing a controlled displacement of said rocket motor relative to said seat structure in response to the detection of a change in attitude by said sensing means, said adjusting means comprising an inertia element operative to provide a reference angle for measuring the change in attitude of said seat structure.

19. In combination with an escape system for removing an occupant from an air or space vehicle and having a seat structure in said vehicle and means including a rocket motor secured to said seat structure and being operative to produce a thrust for projecting said seat structure away from said vehicle, the improvement comprising means for sensing a change in the attitude of said seat structure during its flight, means responsive to the detection of a change in attitude by said sensing means for adjusting the position of the rocket motor thrust vector relative to the center of gravity of the mass being ejected, said adjusting means being operative during ignited rocket flight to change the position of the rocket motor thrust vector in a direction to overcome the effects of an initial eccentricity between said rocket motor thrust vector and the center of gravity of the mass being ejected, said adjusting means being operative to effect said change in the position of said thrust vector by providing a controlled displacement of said rocket motor relative to said seat structure in response to the detection of a change in attitude by said sensing means, and means for hydraulically locking said rocket motor in its adjusted position.

20. In combination with an escape system for removing an occupant from an air or space vehicle and having a seat structure in said vehicle and means including a rocket motor secured to said seat structure and being operative to produce a thrust for projecting said seat structure away from said vehicle, the improvement comprising means for sensing a change in the attitude of said seat structure during its flight, and means responsive to the detection of a change in attitude by said sensing means for adjusting the position of the rocket motor thrust vector relative to the center of gravity of the mass being ejected, said adjusting means being operative during ignited rocket flight to change the position of the rocket motor thrust vector in a direction to overcome the effects of an initial eccentricity between said rocket motor thrust vector and the center of gravity of the mass being ejected, said adjusting means being operative to effect said change in the position of said thrust vector by providing a controlled displacement of said rocket motor under its own thrust and relative to said seat structure in response to the detection of a change in attitude by said sensing means, said adjusting means comprising an inertia element operative to provide a reference angle for measuring the change in pitch attitude of said seat structure.

21. In combination with an ejection seat structure for removing an occupant from a vehicle, an ejection rocket for effecting ejection of said seat structure upon ignition, and means for igniting said rocket, means mounting said rocket on said seat structure and providing for limited displacement of said rocket relative to said seat structure under the thrust exerted by ignition of said rocket during ejection, means for sensing pitch perturbations of said seat structure during its ejected flight from said vehicle and during rocket ignition, and means responsive to the detection of pitch perturbations by said sensing means for controlling the thrust-imparted displacement of said rocket relative to said seat structure.

22. In an occupant escape system having an ejectable seat structure mounted in an air or space vehicle, a rocket motor mounted on said seat structure and being displaceable during its ignition to control the ptich attitude of said seat structure during the ejected flight of said seat structure from said vehicle, means responsive to the pitch orientation of said seat structure during its ejected flight for producing a signal which is representative of a deviation of the pitch attitude of said seat structure from a predetermined pitch attitude, means responsive to said signal for controlling the displacement of said rocket during its ignition, and means for igniting said rocket.

References Cited

UNITED STATES PATENTS 3,265,337 8/1966 Martin ------------- 244—122

FERGUS S. MIDDLETON, *Primary Examiner.*

B. BELKIN, *Assistant Examiner.*

UNITED STATES PATENT OFFICE
CERTIFICATE OF CORRECTION

Patent No. 3,417,947 December 24, 196

Gordon A. Valentine

It is certified that error appears in the above identified patent and that said Letters Patent are hereby corrected as shown below:

Column 1, line 22, "esctpe" should read -- escape --; lin "'1G,"" should read -- "1G" --. Column 2, line 7, "tnd" should read -- and --. Column 5, line 39, "back" should read -- lock Column 9, line 9, "interia" should read -- inertia --. Column line 18, "catapault" should read -- catapult --. Column 11, li 66, cancel "is". Column 13, line 17, "ptich" should read -- pitch --.

Signed and sealed this 10th day of March 1970.

(SEAL)
Attest:

Edward M. Fletcher, Jr.
Attesting Officer

WILLIAM E. SCHUYLER, JR
Commissioner of Patents